L. R. Jenkins,
Belt Shifter,
N° 57,917.
Patented Sept. 11, 1866.
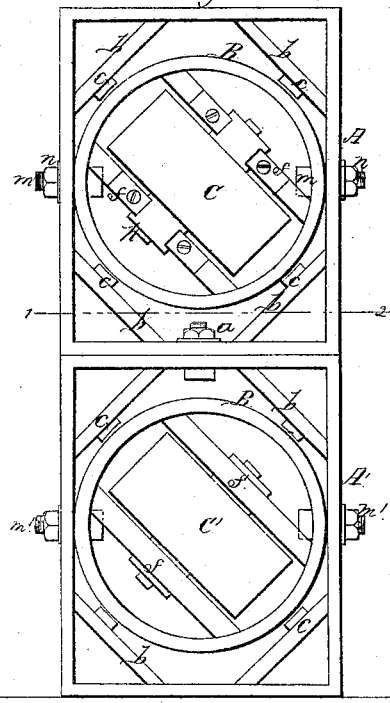
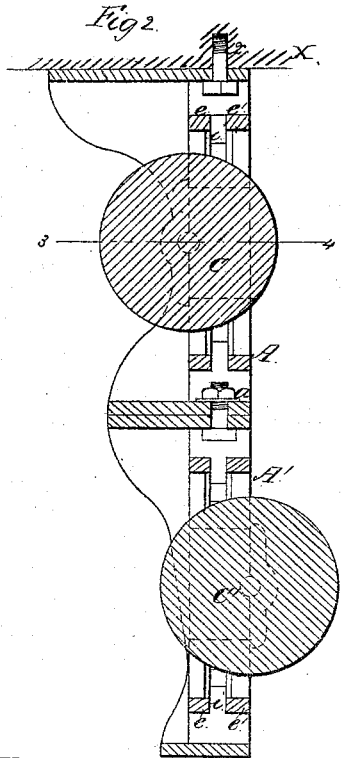
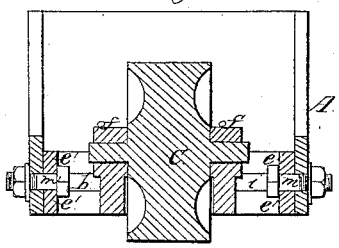
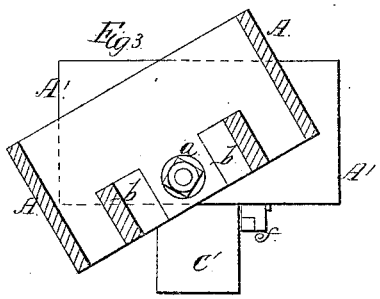
Witnesses
Wm Albert Steel
C. E. Foster
Inventor
L. R. Jenkins
By his attorney
Henry Houser

UNITED STATES PATENT OFFICE.

LEWIS R. JENKINS, OF PHILADELPHIA, PENNSYLVANIA.

IMPROVEMENT IN BELT-GUIDES.

Specification forming part of Letters Patent No. 57,917, dated September 11, 1866.

*To all whom it may concern:*

Be it known that I, L. R. JENKINS, of Philadelphia, Pennsylvania, have invented certain Improvements in Belt-Guides; and I do hereby declare the following to be a full, clear, and exact description of the same, reference being had to the accompanying drawings, and to the letters of reference marked thereon.

My invention consists of certain adjustable hangers, frames, and pulleys, constructed and arranged as fully described hereinafter, so that a belt from a driving-shaft may be readily directed to a shaft or machine placed at an angle to the driving-shaft.

In order to enable others skilled in the art to make and use my invention, I will now proceed to describe its construction and operation.

On reference to the accompanying drawings, which form a part of this specification, Figure 1 is a front elevation of my improved belt-guide; Fig. 2, a vertical sectional elevation; Fig. 3, a section on the line 1 2, Fig. 1, and Fig. 4 a section on the line 3 4, Fig. 2.

A and A' are two boxes or hangers, the hanger A' being secured to the lower side of the hanger A by a bolt, $a$.

Across the inner corners of each hanger extend diagonal braces $b\ b$, and within the upper hanger, A, fits an annular frame, B, the outer side of which is in contact with the sides of the hanger, and with lugs $c\ c$ on the braces $b$.

The frame B consists of two rings, $e\ e'$, which are secured to the ends of cross-pieces $f f'$, so that there shall be an annular slot or opening, $i$, between them, and through this slot pass the shanks of two bolts, $m\ m$, each of which extends through one side of the hanger, and has on its outer end a nut, $n$.

In suitable bearings, secured to the cross-pieces $f f$, turns a shaft, $h$, to which is secured a broad belt-pulley, G.

An annular frame, B', similar to the frame B, and in which turns a belt-pulley, C', is secured within the hanger A', by bolts $m'\ m'$, in the same manner as the frame B is secured in the hanger A.

The hanger A is secured by a bolt, $x$, to a beam, X, or other stationary object, between a driving-shaft and a machine or shaft to which motion is to be communicated.

By loosening the bolts $a$ and $a$, the hangers A and A' can be adjusted to any desired angle in respect to each other and to the driving-shaft; and by loosening the nuts of the bolts $m\ m'$ the annular frames B B' may be turned so as to incline the pulleys C C' to any required extent. When the hangers and pulleys have been properly adjusted, a belt from a pulley on the driving-shaft is passed over the pulley C, round a pulley on the driving-shaft of the machine to be operated, and back over the pulley C', and round the pulley on the main driving-shaft.

It will be seen that by the use of the above-described guide, a belt from a driving-shaft may be conveyed to a machine situated at almost any angle to the same, and that the adjustment of the hangers and pulleys may be made in a few minutes, so that the driving-belt may be quickly transferred from one machine to another in a different position.

Without confining myself to the precise construction and arrangement of parts herein described—

I claim as my invention, and desire to secure by Letters Patent—

The adjustable hangers A and A', with their adjustable frames B and B', and pulleys C C', the whole being constructed and arranged substantially as described, for the purpose specified.

In testimony whereof I have signed my name to this specification in the presence of two subscribing witnesses.

LEWIS R. JENKINS.

Witnesses:
C. B. PRICE,
CHARLES E. FOSTER.